Feb. 15, 1949.    A. J. BRUNO    2,461,718
FILM VIEWER
Filed May 14, 1946
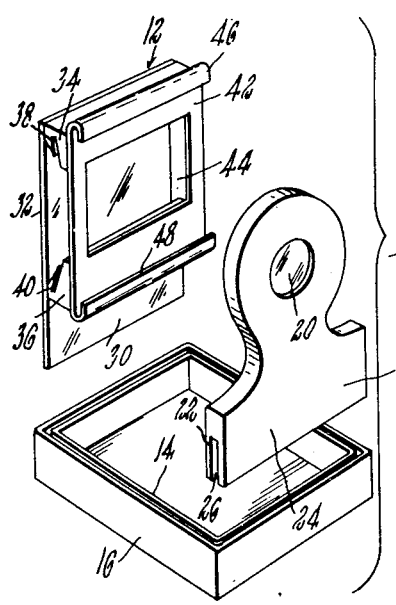
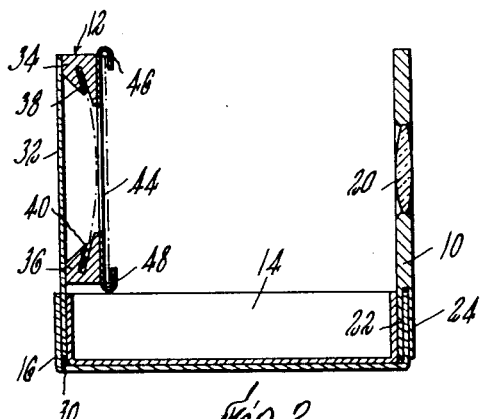
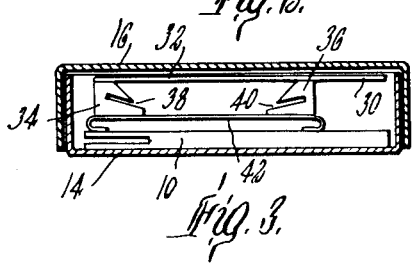
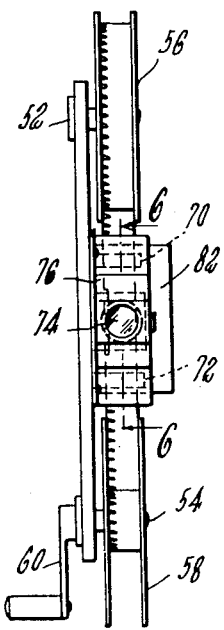
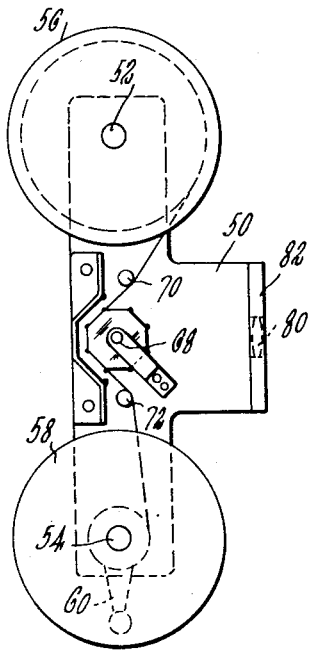
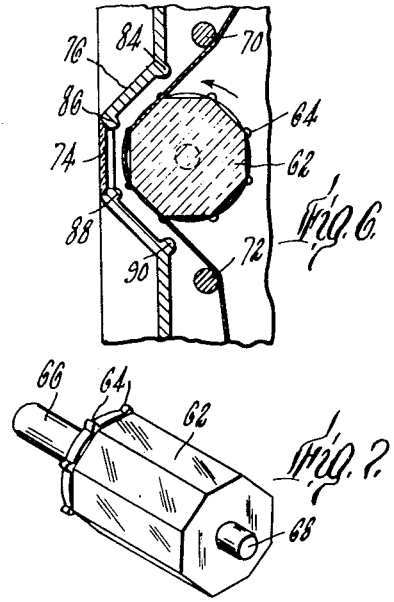
Inventor
Anthony J. Bruno
by Wright, Brown,
Quinby May Attys.

Patented Feb. 15, 1949

2,461,718

UNITED STATES PATENT OFFICE 2,461,718

FILM VIEWER

Anthony J. Bruno, New York, N. Y.

Application May 14, 1946, Serial No. 669,633

1 Claim. (Cl. 88—16.8)

This invention relates to film viewers, particularly viewers by which a film can be inspected by natural illumination. It is an object of the invention to provide a viewer which is simple in structure and can be inexpensively made but which is effective in operation.

For a more complete understanding of the invention, reference may be had to certain embodiments thereof, which are hereinafter described and which are illustrated on the drawing, of which:

Figure 1 is a perspective exploded view of a film viewer embodying the invention;

Figure 2 is a sectional view of the assembled viewer;

Figure 3 is a sectional view of the viewer as collapsed into a package;

Figure 4 is a rear elevational view of a viewer for motion picture film;

Figure 5 is a side elevation of the same;

Figure 6 is a fragmentary section on the line 6—6 of Figure 4;

Figure 7 is a perspective view of the prism element of the viewer.

The form of viewer illustrated in Figures 1, 2, and 3 is designed for viewing single pictures which may conveniently be on a strip of film such as is used in small sized cameras. The viewer comprises four chief parts, namely a lens holder 10, a film holder 12, a box 14, and a cover 16 for the box. The box and its cover may be of any convenient material such as cardboard. When the box is nested within the cover, as illustrated in Figure 1, it serves as a support for the lens holder 10 and film holder 12. The lens holder 10 consists of a plate of suitable material such as a molded plastic having an aperture in which is mounted a lens or eye-piece 20. The lower margin of the plate is in the form of a fin 22 which is sufficiently thin to enter between the end wall of the box 16 and the adjacent end wall of its cover 18 when the box and cover are nested as in Figure 1. The fin 22 thus cooperates with the box and cover to support the lens holder in an upright position as indicated in Figure 2. If desired, a second fin 24 may be provided parallel to the fin 22, these fins being separated by a narrow slot 26 which receives the end wall of the box cover 16 as shown.

At the other end of the box the film holder 12 is similarly mounted by means of a fin 30 at its lower end, this fin preferably being the lower part of a plate 32 of ground glass or equivalent translucent material. Secured to the front face of this plate are a pair of transverse rails 34 and 36 which are provided with kerfs 38 and 40 slightly inclined with respect to the plane of the plate 32 and with respect to each other. These kerfs are arranged to receive the margins of a film inserted therein so as to be held by the rails 34 and 36 in front of the light-diffusing plate 32. The inclination of the kerfs 38 and 40 from a vertical plane causes the film to bend slightly. The natural resilience of the film results in sufficient frictional engagement between the film margins and the sides of the kerfs as to prevent the film from slipping through too easily. Mounted on the front faces of the rails is a frame 42 which has an opening 44 of suitable size to frame the picture on the film end by the rails 34 and 36. If desired, the upper and lower margins of the frame 42 may be bent back as at 46 and 48 to form guide channels to receive a film which is mounted in a cardboard mount as is frequently done to facilitate handling, the upper and lower margins of which mount are held by the bent back flanges 46 and 48 so that the transparent central portion of the film registers with the opening 44. The length of the box 14 is related to the focal length of the lens 20 in such a manner that a film held by the kerfs 38 and 40 or by the flanges 46 and 48 will be substantially at the proper focal distance from the lens 20.

Figure 2 shows the viewer set up for use. When it is desired to collapse the device, the lens holder 10 and the film holder 12 are lifted from their engagement in the slots between the box and its cover and are laid flat within the box as shown in Figure 3. The cover is then put on the box in the usual manner, completing the package.

A viewer for motion pictures is shown in Figures 4, 5, 6, and 7. This viewer preferably comprises a rigid frame 50 having two spindles 52 and 54 mounted near its upper and lower ends and adapted to support two film reels 56 and 58 of conventional type. The upper reel 56 may conveniently be the supply reel, the lower reel 58 being the take-up reel. For rotation of the latter, the spindle 54 may be provided with a crank 60 by which it can be readily rotated. Between the two spindles is rotatably mounted a transparent prism 62 having an even number of sides. In Figure 7 a regular prism having eight faces is illustrated, each face being the same size as one of the frames of a motion picture film which is to be viewed through the prism. According to the invention, this prism is supplied at one end thereof with a series of sprocket teeth 64 adapted to engage in holes along the margin of the strip of the film to be viewed, The prism is supplied with stub shafts 66 and 68 at its respective ends, these shafts being coaxial with the prism itself to support the prism for rotation by being journalled in suitable bearings in the main frame 50 and in a bracket 68 secured to the frame. As shown in Figure 5, a strip of film from the supply reel 56 is brought down to the take-up reel 58 past the prism 62, the arrangement of the prism with respect to the spindles 52 and 54 being such that the axis of the prism is parallel to the axes of these spindles. As indicated in Figure 6, the film which is drawn from the supply reel 52 by rotation of the take-up reel 58 meshes with the teeth 64 as it passes the prism, thus causing the prism to rotate in step with the film. In order to maintain the film in meshed engagement with the teeth 64, suitable guide pins 70 and 72 may be mounted on the frame 50 above and below the prism.

Horizontally in line with the axis of the prism 62 is mounted suitable illumination means comprising, for example, a light distributing element 74 which may be in the form of a translucent window set in an opaque screen or shield 76 of panels mounted edgewise against the frame 50 between the reels 56 and 58. The translucent window 74, which is of ground glass or an equivalent, is in an aperture in the vertical panel of the screen horizontally aligned with the prism and admits diffused light to a portion of the film passing the prism 62. When opposite faces of the prism are both parallel to the window 74, the portion of the film which is registering with these faces is momentarily illuminated by light through the window 74 and is visible when viewed along a horizontal line intersecting these faces. On this line of view is mounted a lens or eyepiece 80 which may be carried at a proper distance from the film by a lens holder 82, the latter being secured to or a part of the frame 50. When the eye of the observer is near the lens 80, looking in a horizontal direction toward the window 74, the successive frames or sections of the film come into momentary view successively as they assume the vertical position adjacent to the window 74 as the prism rotates. These momentary glimpses of the succesive portions of the film linger on the retina a sufficient time to produce the usual illusion of continuous motion.

On the opaque screen 76 a series of ribs 84, 86, 88, and 90 may be provided, these ribs tending to prevent the film from jumping off the teeth 64 in case of momentary slack in the film as it travels past the prism from the supply reel to the take-up reel.

I claim:

A film viewer comprising a vertical frame, spindles on said frame for rotatably supporting film reels near the top and bottom of said frame, a transparent prism rotatably supported by said frame between the reel-supporting means, film-feeding means mounted at one end of said prism having a film-engaging tooth at each angle of the prism, and film-guiding means adjacent to said prism, said film guiding means including two pins mounted on said frame above and below said prism and parallel with the axis thereof, and a shield on said frame having a vertical panel with an aperture horizontally aligned with the prism and adjoining panels inclined forward from the upper and lower edges respectively of the vertical panel for substantially uniform spacing from the periphery of the prism, said panels having horizontal ribs projecting therefrom toward the prism tending to prevent a film on said prism from becoming disengaged from said feeding teeth.

ANTHONY J. BRUNO.

REFERENCES CITED

The following references are of record in the file of this patent:

UNITED STATES PATENTS

| Number | Name | Date |
|---|---|---|
| 1,487,173 | Manion | Mar. 18, 1924 |
| 1,520,566 | Dorn | Dec. 23, 1924 |
| 1,548,573 | Ackley | Aug. 4, 1925 |
| 1,989,454 | Koster | Jan. 29, 1935 |
| 2,129,759 | Goldman | Sept. 13, 1938 |
| 2,325,131 | Harrison | July 27, 1943 |
| 2,381,997 | Bolsey | Aug. 14, 1945 |

FOREIGN PATENTS

| Number | Country | Date |
|---|---|---|
| 16,201 | Great Britain | July 14, 1913 |
| 637,357 | Germany | Oct. 27, 1936 |
| 682,848 | Germany | Oct. 23, 1939 |
| 517,472 | Great Britain | Jan. 31, 1940 |